United States Patent [19]

Karanian

[11] Patent Number: 4,620,679
[45] Date of Patent: Nov. 4, 1986

[54] VARIABLE-GEOMETRY INLET

[75] Inventor: Arthur J. Karanian, Wethersfield, Conn.

[73] Assignee: United Technologies Corporation, Hartford, Conn.

[21] Appl. No.: 637,194

[22] Filed: Aug. 2, 1984

[51] Int. Cl.$^4$ .............................................. B64D 33/02
[52] U.S. Cl. .................................... 244/53 B; 137/15.1
[58] Field of Search .................... 244/53 B, 201, 208; 137/15.1, 15.2

[56] References Cited

U.S. PATENT DOCUMENTS

| 3,011,307 | 12/1961 | Edelfelt | 137/15.1 |
| 3,104,522 | 9/1963 | Pennington et al. | 244/53 B |
| 3,765,179 | 10/1973 | Strang et al. | 244/53 B |
| 3,941,336 | 3/1976 | Nangia | 244/53 B |
| 4,381,017 | 4/1983 | Bissinger | 244/53 B |

*Primary Examiner*—Galen Barefoot
*Attorney, Agent, or Firm*—Norman Friedland

[57] ABSTRACT

A two-dimensional inlet for a high speed ram jet missile includes in combination an educated slot and a single ramp for varying the geometry of the inlet.

2 Claims, 2 Drawing Figures

VARIABLE-GEOMETRY INLET

DESCRIPTION

TECHNICAL FIELD

This invention relates to inlets for high speed flight vehicles and particularly to supersonic two-dimensional variable-geometry inlets.

BACKGROUND ART

As is well known, the inlet of a missile and the like is extremely critical and has a significant influence on the range, thrust level and maneuver capability of the vehicle. One significant contribution to inlets of supersonic missiles was the development of educated slots.

An educated throat bleed system is a passive throat bleed bypass arrangement which can enhance the stability of ramjet inlets. An educated bleed slot is one which passes only small amounts of bleed flow with supersonic approach Mach numbers (inlet supercritical) while maintaining approximately the higher bleed airflow characteristics of a plain slot when the flow over the slot is subsonic (inlet critical or subcritical). This provides a high ratio of critical-to-supercritical bleed airflow. This is accomplished by recessing the downstream lip of the bleed slot so that a large amount of the supersonic flow which expands around the bleed opening is turned back into the inlet. With subsonic flow approaching the bleed slot, the amount of flow bled is relatively unaffected by the fact that the lip is recessed.

An appropriate educated bleed slot design limits the supercritical inlet bleed flow (equivalent to that at pseudo-critical inlet operation) to that just required for boundary layer removal while providing for much larger amounts of bleed flow when external or internal flow perturbations suddenly push the inlet operation to near-critical, thus providing a bleed stability system.

The advantages and disadvantages of fixed and variable-geometry inlets have long been recognized. In favor of fixed-geometry inlets is its simplicity while variable-geometry inlets generally consist of a number of moving ramps contributing to its complexity with a consequential increase in weight.

I have found that I can improve overall performance of a two-dimensional inlet for a ramjet missile by providing variable geometry by a single ramp operating in combination with an educated slot. The single ramp is hinged at its aft end and unattached at its leading edge which is judiciously located relative to an educated slot bleed system.

The use of a single ramp in the educated slot configuration provides a more simple means for obtaining variable internal flow contraction and variable bleed area, thus making the variable-geometry inlet potentially more attractive than the fixed-geometry inlet for some applications. In this configuration the external-compression part of the inlet remains fixed.

DISCLOSURE OF INVENTION

An object of this invention is to provide an improved nominal two-dimensional inlet for a supersonic propulsion system. A feature of this invention is to combine an educated slot and a single variable ramp cooperating therewith to vary the geometry of the inlet during high Mach numbers to increase pressure recovery at the inlet.

Other features and advantages will be apparent from the specification and claims and from the accompanying drawings which illustrate an embodiment of this invention.

BEST MODE FOR CARRYING OUT THE INVENTION

Figure 1:
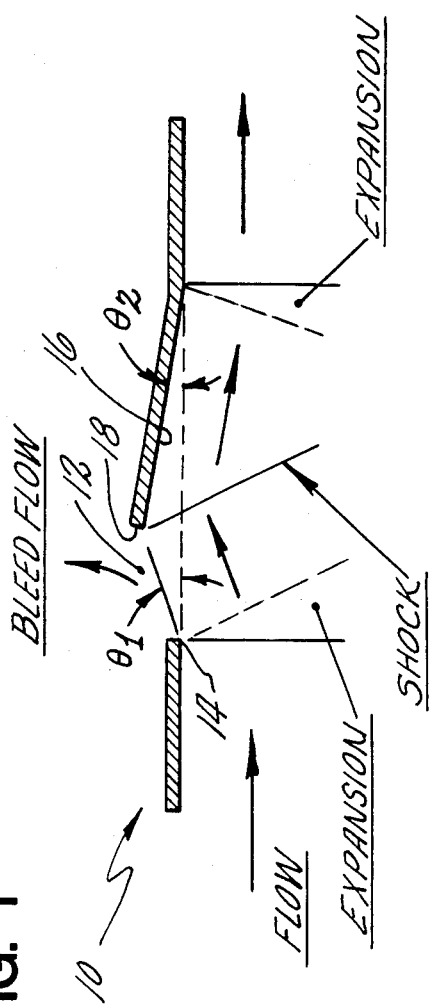
FIG. 1 is a schematic illustration of an educated slot in the inlet.

The educated slot concept is illustrated in FIG. 1. As best seen, the slot 12 formed in the two-dimensional inlet generally illustrated by reference numeral 10 (only that portion necessary for an understanding of the concept is presented). The slot is dimensioned such that the bleed flow substantially reverses direction relative to the flow through the inlet. The lip 14 at the inlet relative to the wall 16 extending from lip 18 (where the shock will occur) provides a diffusion section where the flow will expand, as demonstrated on FIG. 2.

The educated slot 10 with its prescribed optimum geometry provides a small amount of boundary layer bleed during inlet supercritical operation and larger bypass bleed flow during near critical operation for stability (i.e., inlet margin). The removal of boundary layer flow and the increased inlet contraction ratio resulting from the variable geometry provides maximum inlet pressure recovery. The educated slot design limits the supercritical flow to that desired for boundary layer removal while providing for much larger amounts of bleed flow when external or internal flow perturbations suddenly push the inlet operation to near-critical.

Figure 2:
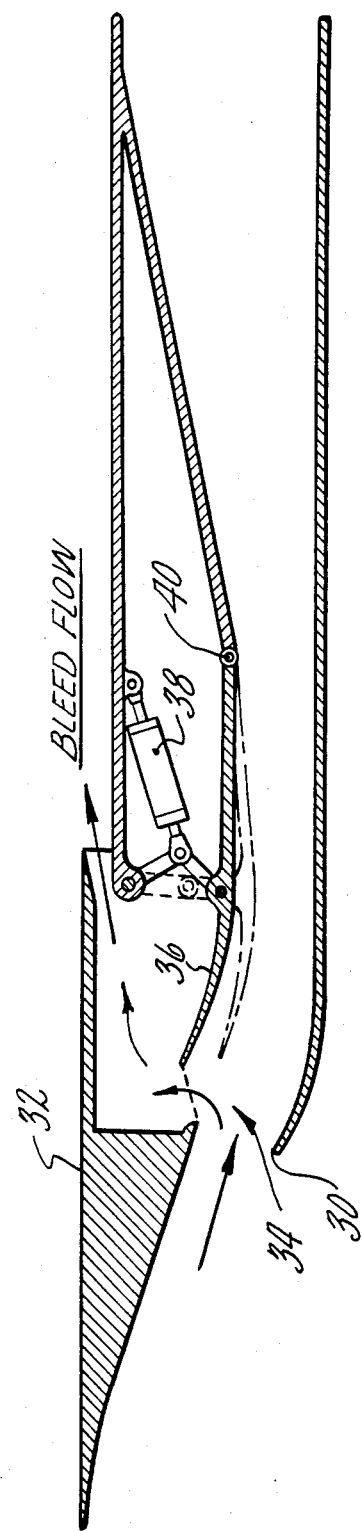
FIG. 2 is a schematic illustration showing the combined single ramp hinged at the aft end of the smoothly contoured educated slot.

According to this invention the educated throat slot is combined with a single variable ramp. This is best shown in FIG. 2. The inlet 30 of the high speed vehicle 32 includes the educated slot section 34 and the single ramp 36 located at the throat section on the compression surface. As indicated in phantom the ramp is positioned by a suitable actuator 38 which is suitably hinged by the hinged connection 40 at the aft end of the movable ramp. It is to be understood that any type of actuator (electrical, hydraulic or pneumatic) may be employed as it does not constitute a part of the invention. Suffice it to say, the ramp serves to change the throat area for certain high Mach number operating conditions. It is hinged at its aft end to permit the desired ramp rotation (throat flow area variation) while providing a continuous smooth compression flow surface. (Due to the limited rotation required, the hinge action could be provided by a continuous flexible-joint hinge.) The variable-ramp has a leading edge geometry which provides the educated bleed slot at the ramjet takeover condition (lowest ramjet operating condition). As the ramjet flight Mach number is increased the variable ramp 36 can be moved towards the high internal contraction position (reduce throat flow area) to increase the pressure recovery of the inlet.

Thus, the educated slot design requirements permit a single ramp contour to be appropriate over the nominal Mach number range of interest; i.e., at ramjet takeover conditions the single ramp 36 contour shown in FIG. 2 limits the supercritical bleed flow to that desired for boundary layer removal; as the ramp 36 is moved to reduce the throat flow area for operation at higher flight Mach numbers, the bleed slot design changes to permit more boundary layer bleed flow removal consistent with obtaining maximum internal contraction and thereby maximum inlet pressure recovery.

It should be understood that the invention is not limited to the particular embodiments shown and described herein, but that various changes and modifications may be made without departing from the spirit and scope of this novel concept as defined by the following claims.

I claim:

1. A supersonic air inlet designed to be operational solely when in the supersonic envelope of the flight envelope for a high speed air breathing powered vehicle including a two dimensional duct capable of flowing air at Mach numbers over 1, a variable ramp section for reducing the area of the throat of the inlet at high Mach numbers and an educated slot adjacent the variable ramp, the variable ramp disposed downstream of the educated slot consisting of a single flat like aerodynamically shaped body pivotally mounted to more laterally with respect to the air flowing in said ramp, said two dimensional duct having an upstream wall fixed relative to said vehicle defining a surface for the flowing air protruding further into the airstream than the surface of said ramp and means for positioning said body to reduce the throat area so that in combination with said educated slot formed in said inlet transverse to said air flowing in said inlet at the upstream end of said body, is modified to a slot.

2. An air inlet as in claim 1 wherein in said body is pivoted at its most downstream end relative to the flow of air in said inlet.

* * * * *